United States Patent [19]

Hunger

[11] Patent Number: 4,907,815

[45] Date of Patent: Mar. 13, 1990

[54] FIFTH WHEEL COUPLING

[76] Inventor: Walter Hunger, Otto-Nagler-Strasse 13, 8700 Wuerzburg, Fed. Rep. of Germany

[21] Appl. No.: 301,147

[22] Filed: Jan. 25, 1989

[51] Int. Cl.[4] .................... B62D 53/10; B62D 53/12
[52] U.S. Cl. .................... 280/435; 280/433; 280/434; 280/436
[58] Field of Search ............... 280/433, 434, 435, 436, 280/437

[56] References Cited

U.S. PATENT DOCUMENTS

| | | | |
|---|---|---|---|
| 3,352,571 | 11/1967 | Nelson | 280/435 |
| 3,539,202 | 11/1970 | Nelson | 280/434 |
| 4,106,793 | 8/1978 | Neff | 280/435 |

FOREIGN PATENT DOCUMENTS 58-97572  6/1983  Japan .

Primary Examiner—Charles A. Marmor
Assistant Examiner—Wook Yoon
Attorney, Agent, or Firm—Foley & Lardner, Schwartz, Jeffery, Schwaab, Mack, Blumenthal & Evans

[57] ABSTRACT

A fifth wheel coupling for connecting a semitrailer to a towing vehicle, which provides two swivel-articulated closing jaws with semicircular clearances for grasping a semitrailer king pin, and means for opening and closing the jaws which provide a hydraulic cylinder, a piston disposed therein with a rod having a central bore, a tappet disposed within the bore and protruding into the semicircular clearances, piston head and piston rod spaces, and a channel connecting the spaces which is closable by the tappet. Pressurization of the hydraulic cylinder opens the jaws, and contact of the semitrailer king pin against the tappet automatically closes the jaws.

19 Claims, 7 Drawing Sheets

FIFTH WHEEL COUPLING

BACKGROUND OF THE INVENTION

The present invention relates to a fifth wheel coupling having two swivel-articulated closing jaws in symmetrical arrangement with which the king pin is enclosed by the semicircular clearance of the jaws. Such a fifth wheel coupling is known from U.S. Pat. No. 3,352,571 or JP 58-97 572.

An advantage of these fifth wheel couplings, with which the king pin of the semitrailer is enclosed by the semicircular clearances of the closing jaws in travelling operation, is that the contact surface between the closing jaws and the king pin is large and therefore only small contact pressures occur. On the other hand, the known fifth wheel couplings are not very convenient to use.

In the case of the design known from U.S. Pat. No. 3,352,571, the closing jaws are held in their closed position by a locking bolt which can be advanced transversely to the direction of travel and makes the design complex and voluminous. An automatic closing and opening sequence is not possible.

A similar situation applies to the design known from JP 58-97572, in which the closing jaws are actuated by a servo device, which is likewise very complicated. It includes a pneumatic cylinder, which pushes by means of a grooved cam plate a fork-shaped blocking device in the direction of travel, which fixes the closing jaws in their closed position.

In this design, due to the compressibility of the air, the pneumatic cylinder is not suitable for fixing the closed end position of the closing jaws. Therefore, in addition to the servo device described, another kinematic locking mechanism, ensuring the closed position of the closing jaws, has to be provided.

Thus, the operation of these known designs is very complex.

SUMMARY OF THE INVENTION

It is therefore an object of the present invention to create a safe and reliable fifth wheel coupling which is easy and convenient to operate.

These and other objects are achieved according to the invention by a fifth wheel coupling for connecting a semitrailer to a towing vehicle, comprising two swivel-articulated closing jaws having semicircular clearances for grasping a king pin on the semitrailer and a means for swiveling the jaws between open and closed positions, comprising a hydraulic cylinder comprising an actuating piston displaceably seated in the hydraulic cylinder and having a piston head defining with the cylinder a piston head space, an actuating piston rod defining with the cylinder a piston rod space, and a channel connecting the piston head space and piston rod space; a means for biasing the actuating piston in the inward position; a spool valve seated in one end of a central bore in the actuating piston rod and movable between a first position in which the channel is closed and a second position in which the channel is open; a tappet seated in the other end of the central bore in the actuating piston rod and protruding into the semicircular clearances and movable between a first position in which the channel is open and a second position in which the channel is closed; and a means for biasing the tappet in the outward position.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the design according to the invention, the opening of the closing jaws takes place in a very simple way by pressurization of the hydraulic cylinder and the closing takes place fully automatically whenever the king pin of the semitrailer moving into the coupling position presses against the tappet.

Figure 1:
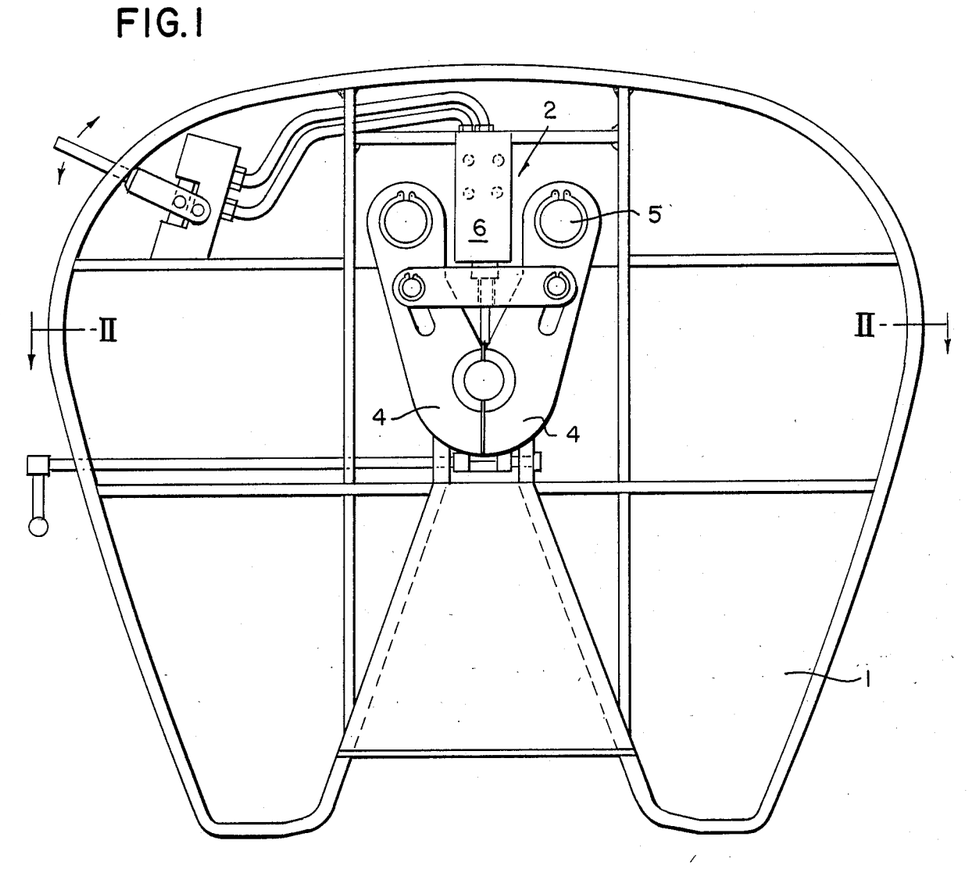
FIG. 1 shows the view of the coupling plate from below with the kinematic locking mechanism of the king pin.
Figure 2:
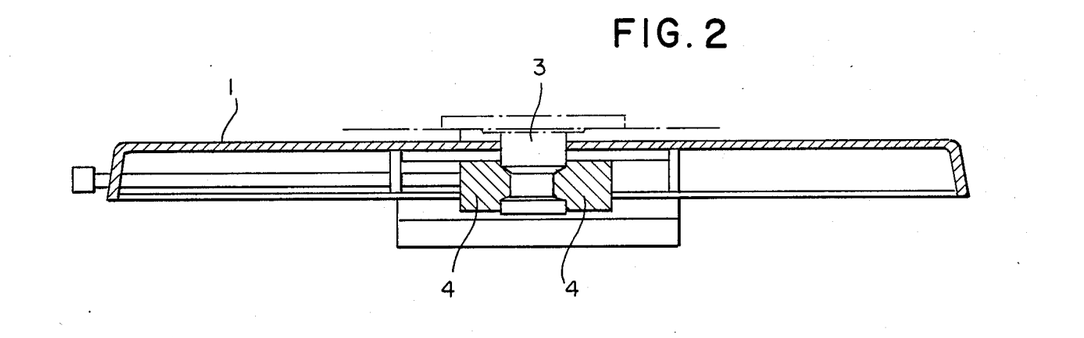
FIG. 2 shows the section along line II—II in FIG. 1.

FIG. 1 shows the underside of coupling plate 1 with kinematic locking mechanism 2 for king pin 3 of a semitrailer. This kinematic locking mechanism consists essentially of two closing jaws 4, which are arranged symmetrically to the longitudinal plane and are held by means of joint bolts 5 in a swiveling manner on coupling plate 1. A hydraulic cylinder 6 actuates the closing jaws. At the back end of each closing jaw 4 is a semicircular clearance 9. In a closed position of the closing jaws, these clearances complement each other to form an annular space in which king pin 3 is locked. As shown in particular in FIGS. 1 and 2, in the closed position of closing jaws 4, king pin 3 is seized, encompassing a wide area over its entire circumference, so that the contact pressures acting during operation remain small.

Figure 3:
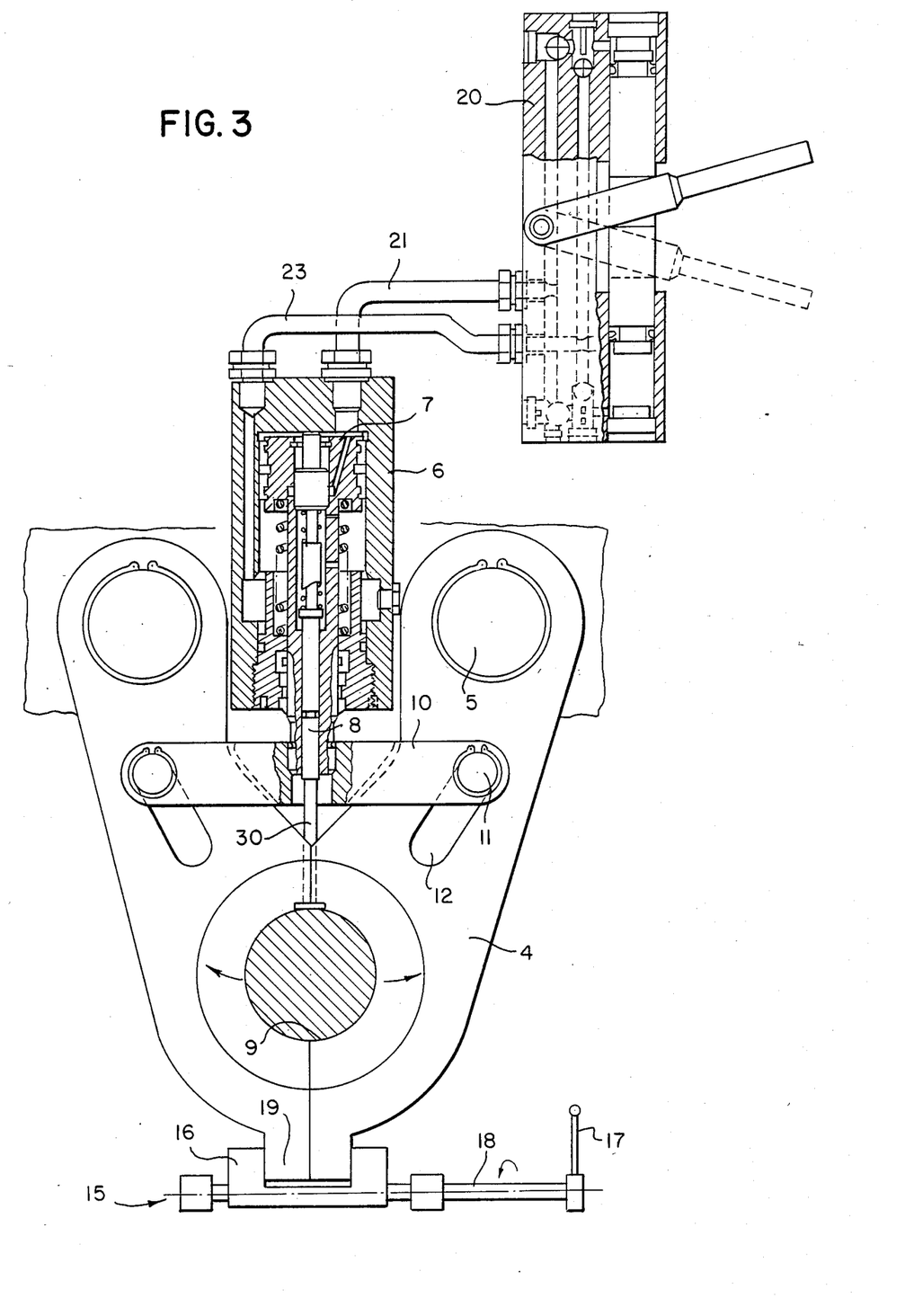
FIG. 3 shows the kinematic locking mechanism in the locking position.
Figure 4:
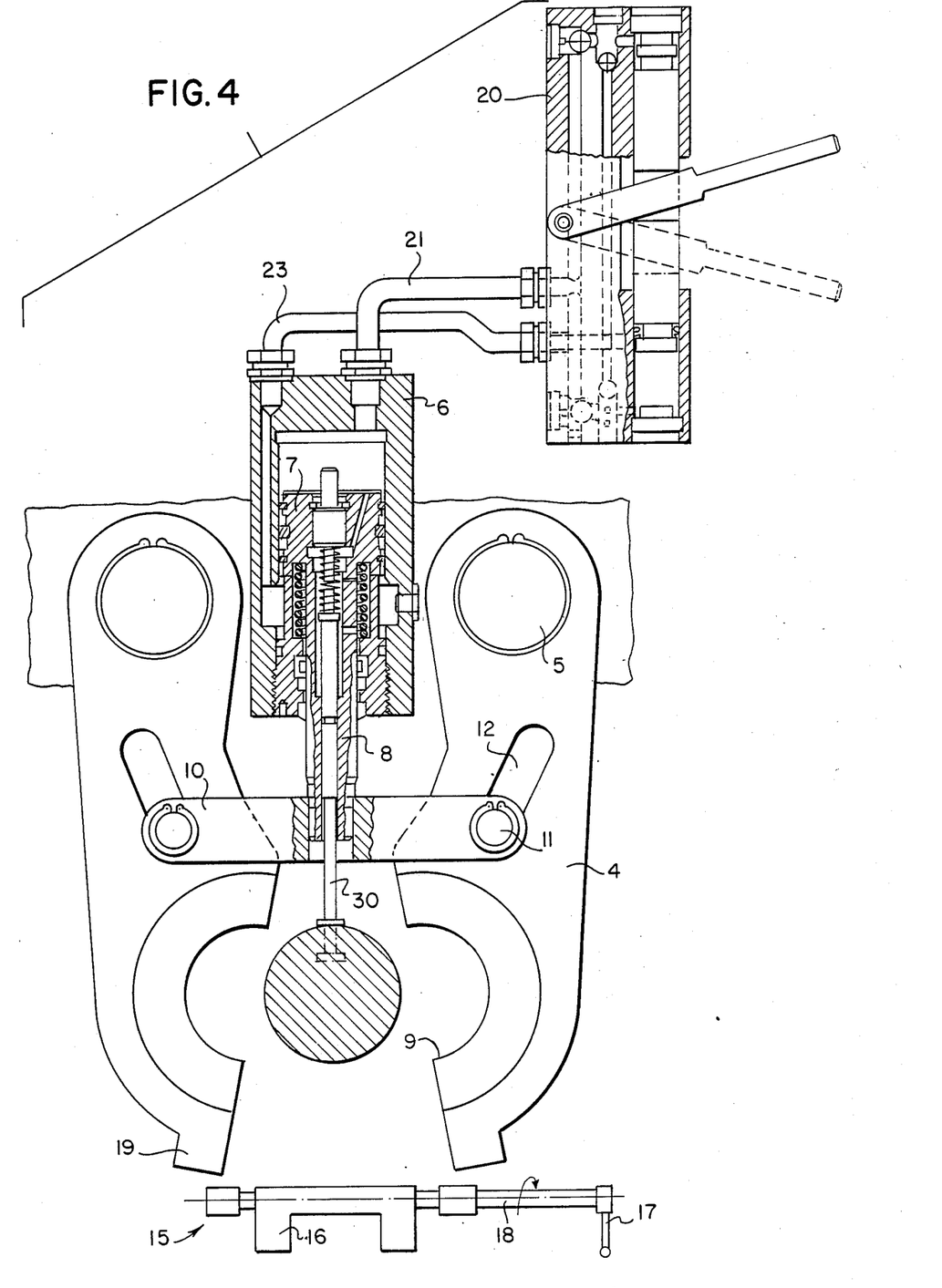
FIG. 4 shows the kinematic locking mechanism in the release position.

Actuating piston 7 is seated displaceably in hydraulic cylinder 6. Piston 7 has a rearwardly pointing actuating piston rod 8 which bears at its end a transverse bar 10. Sliding blocks 11 are fastened at the ends of transverse bar 10 and are guided in sliding grooves 12 of closing jaws 4. These are directed in such a way that closing jaws 4 open when actuating piston rod 8 moves out (i.e., downward in FIG. 3) and close when actuating piston rod 8 moves in (i.e., upward in FIG. 3). FIG. 3 shows the closed locking position and FIG. 4 shows the open release position, in which the king pin is released and the towing vehicle tractor and semitrailer can be moved apart or together.

For fixing the locking position, there is provided at the rear end of closing jaws 4 mechanical locking device 15 for engaging rearward extensions 19 on closing jaws 4. Locking device 15 consists essentially of clamp 16 fastened on swivel axis 18. Swivel axis 18 can be turned by means of swivel lever 17. Turning swivel axis 18 to its effective position causes clamp 16 to hold together the two rearward extensions 19 (one on each of the closing jaws 4).

Pressurization of hydraulic cylinder 6 is served by double-acting hand pump 20. Pressure line 21 leads to pressure connection 22 of the hydraulic cylinder. Return line 23 leads to return connection 24 of the hydraulic cylinder.

Tappet 30 is displaceably seated in a central bore of the actuating piston rod. In its moved-out state, the rear end of tappet 30 protrudes into the space adopted by king pin 3. The operation of tappet 30 during coupling of a semitrailer when it is pushed in by the king pin is described hereinafter.

Figure 5:
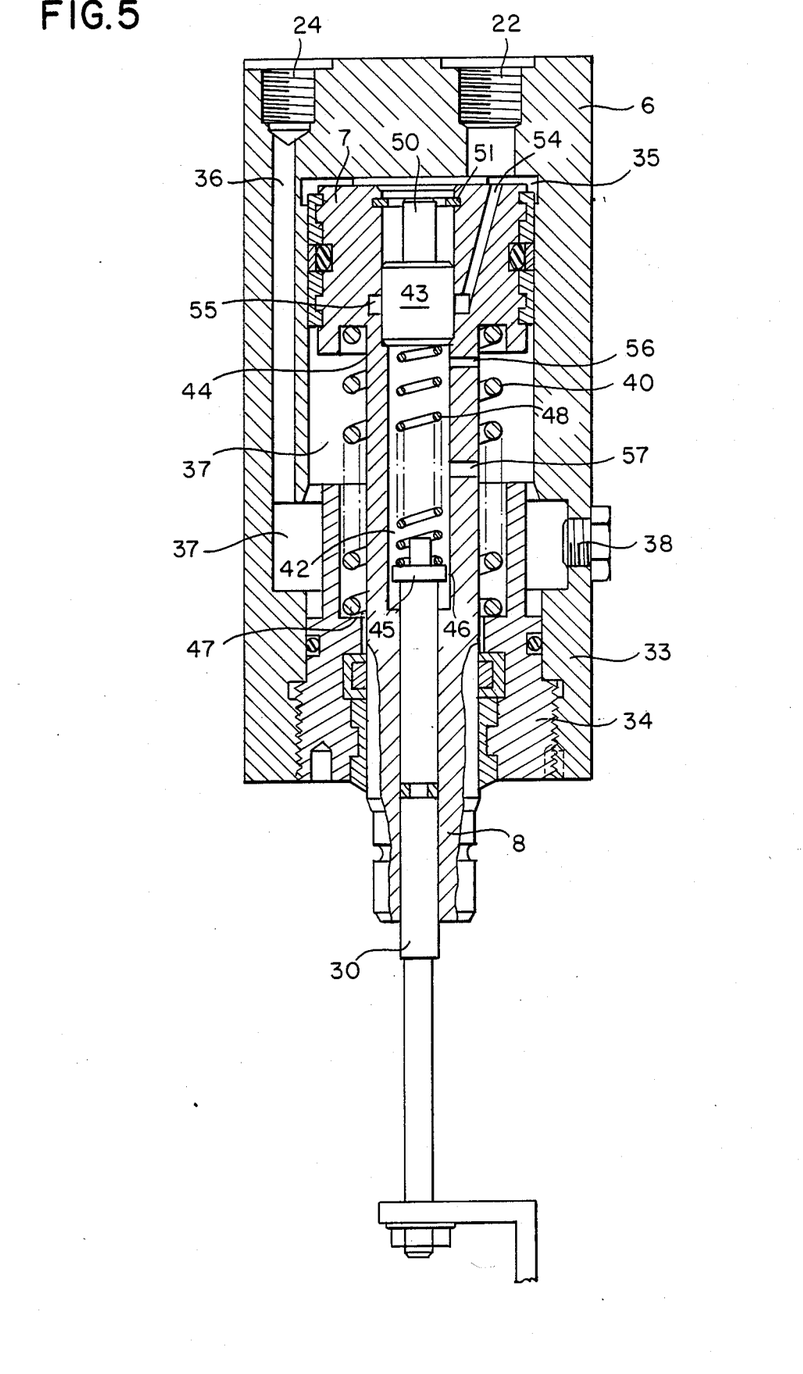
FIG. 5 shows the hydraulic cylinder in the locking position of the kinematic locking mechanism.

Referring now to FIG. 5, hydraulic cylinder 6 consists of cylindrical body 33 and cover 34, which is fastened in the rear end of the latter. Actuating piston rod 8 is guided in a sealed manner in cover 34. The rod seals and distance seals are not provided with reference numerals. Pressure connection 22 opens out into piston head space 35 and return connection 24 opens out via lateral axial bore 36 into the piston rod space 37. In this region, vent plug 38 is provided in the cylinder wall. This plug includes an air-permeable sintered metal insert and, in the horizontal the installation position of the hydraulic cylinder 6, is at the top.

Between the rearward annular face of piston 7 and the inner face of cover 34 is strong locking spring 40. Spring 40 embraces actuating piston rod 8 and biases the piston in the direction of inward movement.

Actuating piston 7 forms, together with actuating piston rod 8, an integral part, in which doubly graduated central bore 42 is formed. In the front, widest section there is displaceably seated spool valve 43. Front shoulder 44 at the first diameter graduation point serves as rearward stop for spool valve 43.

In the rear, narrowest section, tappet 30 is guided. Tappet 30 has collar 45, which lies in the region of the middle section of central bore 42. The outside surface of collar 45 forms annular restricting gap 46 with the inside surface of this section. Rear shoulder 47 acts as a stop for collar 45.

Relatively weak tappet spring 48 is inserted between collar 45 and the rear end face of spool valve 43. Tappet spring 48 tends to drive the two parts apart. Stop continuation 50 is formed at the front end of spool valve 43. In the front position of spool valve 43 relative to actuating piston 7, stop continuation 50 projects beyond the piston head.

To limit the outward movement and to fix this front relative position, circlip 51 is inserted in a turned relief in the vicinity of the front end of central bore 42.

Overflow channel 54 is formed in actuating piston 7. Overflow channel 54 extends from the piston head and leads to turned relief 55, which is closed by spool valve 43 in the rear relative position of the latter. In the middle section of central bore 42 are two cross bores, which connect the interior of central bore 42 to piston rod space 37. Narrow restricting bore 56 is in the vicinity of front shoulder 44 and wider overflow bore 57 is in the region lying further back of the middle section.

The fifth wheel coupling described functions as follows:

In driving operation, clearances 9 of closing jaws 4 surround king pin 3 and lock it. This locking position of the closing jaws is secured by mechanical locking device 15. As shown in FIG. 3, extensions 19 are held together by clamp 16 in the locked position.

To uncouple the semitrailer from the towing vehicle, clamp 16 is first swivelled into the release position by swieling of swivel lever 17. Thereafter, hand pump 20 is operated, so that pressure fluid is pumped into pressure line 21, which pressurizes piston head space 35.

The pressure buildup in piston head space 35 begins to push the actuating piston to the rear, so that actuating piston rod 8 moves out and swivels closing jaws 4 apart by means of transverse bar 10 and sliding blocks 11. The pressure in piston head space 35 holds spool valve 43 against the action of tappet spring 48 in the stop at front shoulder 44, to be precise even during the piston movement, during which tappet spring 48 is compressed because tappet 30, the rear end of which is in the stop on the king pin, does not follow the outward movement.

Figure 6:
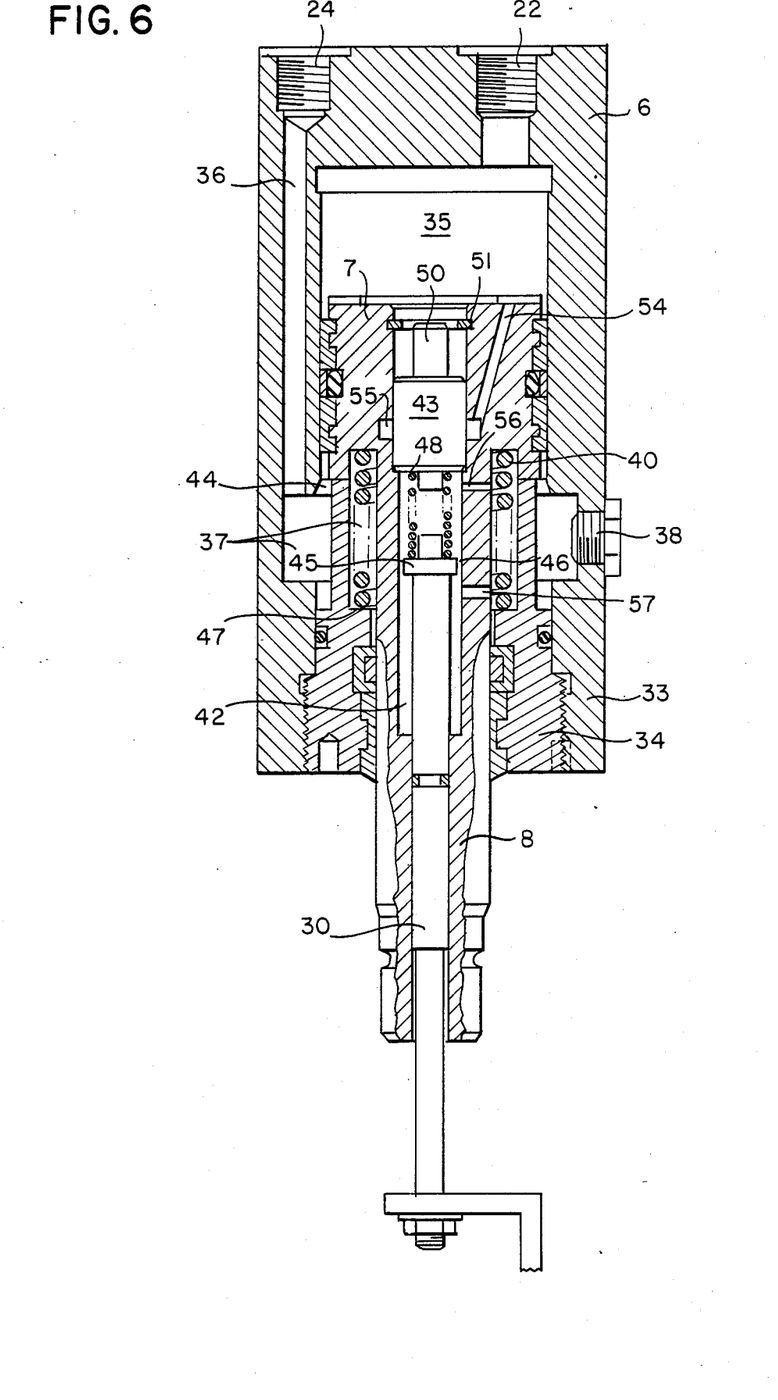
FIG. 6 shows the hydraulic cylinder in the release position of the kinematic locking mechanism and with the semitrailer not yet removed.

The position of the parts on completion of the outward movement described can be seen in FIGS. 4 and 6: while tappet 30 has retained its position, actuating piston rod 8 has moved out and has opened closing jaws 4. King pin 3 is released and the towing vehicle can move away from the jacked-up semitrailer.

Figure 7:
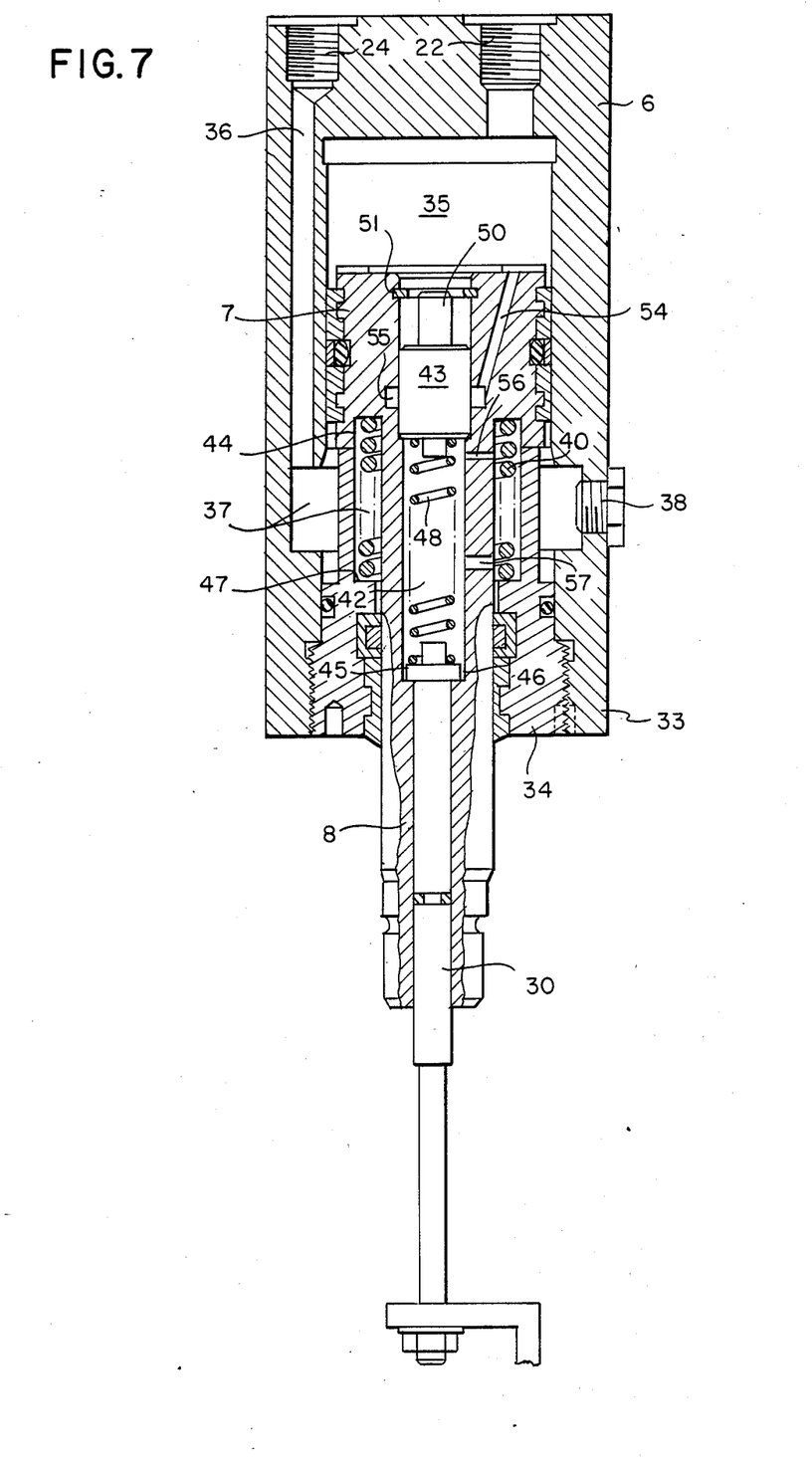
FIG. 7 shows the hydraulic cylinder in the release position of the kinematic locking mechanism after removal of the semitrailer.

During this removal of the king pin from the fifth wheel coupling, the stop of tappet 30 falls away and tappet spring 48 pushes the tappet in the direction of outward movement into the rear relative position, which can be seen in FIG. 7. The outward movement of tappet 30 takes place in a damped manner, because the fluid enclosed behind collar 45 flows through restricting gap 46 only slowly.

Figure 8:
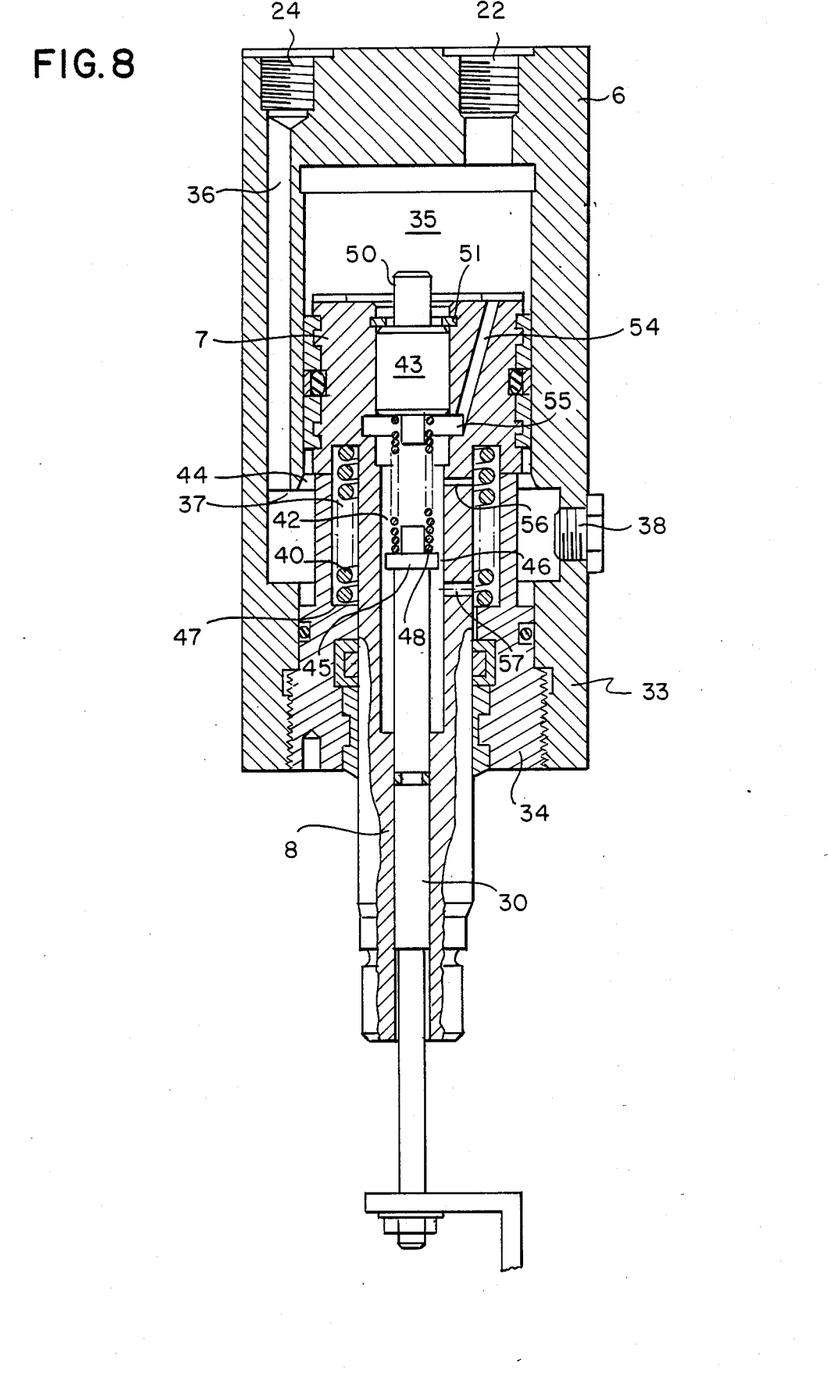
FIG. 8 shows the hydraulic cylinder after moving-in of the king pin of the semitrailer and still in the release position of the kinematic locking mechanism.

If the semitrailer is to be recoupled, starting from the initial position shown in FIG. 7, the towing vehicle moves up until the king pin enters the end of the receiving recess of the fifth wheel coupling plate, tappet 30 being pushed forwards. If, during this forward movement of tappet 30, collar 45 of the latter passes by overflow bore 57 and the fluid in the remaining section of the central bore ahead of the collar can only escape by overflowing via restricting gap 46 and through restricting bore 56, pressure begins to build up in this section which, together with tappet spring 48, is sufficient to push spool valve 43 forwar up to the stop on circlip 51. This is illustrated in FIG. 8.

In this position of spool valve 43 relative to actuating piston 7, turned relief 55 is released, so that overflow channel 54 comes into connection with the rear region of central bore 42 and, via overflow bore 57, with piston rod space 37. As a result, the piston can be pushed forwards by locking spring 40 with displacement of fluid from piston head space 35 into piston rod space 37, so that actuating piston rod 8 moves in and closing jaws 4 close around the king pin.

Towards the end of this movement, stop continuation 50 of spool valve 43 comes into contact with the head of hydraulic cylinder 6, so that spool valve 43 is pushed in relative to actuating piston 7 until the movement in the end position of piston 7 is completed. This restores the locking position shown in FIG. 5. Mechanical locking device 15 then has to be swivelled into its effective position, after which the semitrailer is coupled on the towing vehicle.

The volume equalization necessary during moving in and moving out of the actuating piston takes place by the sintered metal insert in vent plug 38. On actuation of hand pump 20, the latter sucks the same amount of fluid in via return line 23 as it feeds into pressure line 21. Since in the outward movement of actuating piston 7, more fluid has to flow into piston head space 35 than is displaced from piston rod space 37, the equalization takes place by air being sucked in from the atmosphere through vent plug 38. This air collects in the hollowed-out region of piston rod space 37 underneath vent plug 38 (the vent plug drawn in FIGS. 3 and 4 for the sake of completeness is not in reality at the side but, as said, at the top on horizontally-lying hydraulic cylinder 6).

During the inward movement of actuating piston 7, this collected volume of equalizing air is again displaced through vent plug 38. In this way, the hollowed-out region of piston rod space 37 acts as a hydraulic fluid reservoir and a special storage tank for hydraulic fluid is unnecessary.

The speed with which the above-described operations take place, particularly the automatic closing of the closing jaws, is determined by suitable choice of the rigidities of the springs involved and of the restricting points. The surfaces of the fifth wheel coupling exposed to mechanical friction during operation, in particular the inside surface of clearances 9 of the closing jaws, are provided with a suitable antifriction coating.

What is claimed is:

1. A fifth wheel coupling for connecting a semitrailer to a towing vehicle, comprising:
   two swivel-articulated closing jaws having semicircular clearances for grasping a king pin on the semitrailer;
   means for swiveling the jaws between open and closed positions, comprising:
   a hydraulic cylinder comprising an actuating piston displaceably seated in the hydraulic cylinder and having a piston head defining with the cylinder a piston head space, an actuating piston rod defining with the cylinder a piston rod space, and a channel connecting the piston head space and piston rod space, the piston movable between an outward position in which the jaws are opened and an inward position in which the jaws are closed;
   means for biasing the actuating piston in the inward position;
   a spool valve seated in one end of a central bore in the actuating piston rod and movable between a first position in which the channel is closed and a second position in which the channel is open;
   a tappet seated in the other end of the central bore in the actuating piston rod and protruding into the semicircular clearances so as to be engagable with the king pin, the tappet being movable between a first position in which the tappet actuates the spool valve to its second position channel tappet allows the spool valve to move to its first position closed; and
   means for biasing the tappet in the outward position.

2. A fifth wheel coupling according to claim 1, additionally comprising pressure means for moving the actuating piston to its outward position.

3. A fifth wheel coupling according to claim 1, additionally comprising a collar on the tappet which forms a narrow annular gap between its outer circumference and the inner wall of the central bore.

4. A fifth wheel coupling according to claim 1, additionally comprising two crossbores connecting the central bore of the actuating piston and the piston rod space, a first one the crossbores lying near the tappet end of the actuating piston and a second one of the crossbores lying between the first cross bore and the spool valve.

5. A fifth wheel coupling according to claim 4, wherein the second crossbore is narrower than the first crossbore.

6. A fifth wheel coupling according to claim 1, additionally comprising a vent plug connected to the piston rod space.

7. A fifth wheel coupling according to claim 1, additionally comprising a hollowed-out region of the piston rod space adjacent the vent plug.

8. A fifth wheel coupling according to claim 1, additionally comprising an air-filtering sintered metal insert seated in the vent plug.

9. A fifth wheel coupling according to claim 1, additionally comprising a mechanical locking device for fixing the locking position of the closing jaws.

10. A fifth wheel coupling according to claim 9, wherein the locking device comprises an extension on each of the closing jaws.

11. A fifth wheel coupling according to claim 10, wherein the locking device comprises a clamp which engages the extensions on the closing jaws.

12. A fifth wheel coupling according to claim 1, wherein the spool valve additionally comprises a stop continuation.

13. A fifth wheel coupling according to claim 1 wherein the actuating piston biasing means comprises a locking spring.

14. A fifth wheel coupling according to claim 3, wherein the tappet biasing means comprises a tappet spring.

15. A fifth wheel coupling according to claim 14, wherein one end of the tappet spring contacts the tappet collar and the other end of the tappet spring contacts the spool valve.

16. A fifth wheel coupling according to claim 1, wherein the means for swiveling the jaws additionally comprises a transverse bar mounted on the actuating piston rod and having a sliding block fastened at each end, wherein each sliding block is guidably mounted in sliding grooves of the closing jaws.

17. A fifth wheel coupling according to claim 11, wherein the locking device additionally comprises a swivel lever for moving the clamp between open and closed positions.

18. A fifth wheel coupling according to claim 1, wherein the central bore is doubly graduated, with the spool valve being seated in the wider section and the tappet being seated in the narrower section.

19. A fifth wheel coupling according to claim 18, additionally comprising a shoulder between the graduated sections of the bore, the shoulder serving as a stop for the spool valve.

* * * * *